April 18, 1967 E. R. BURNS 3,314,358
COOKING UTENSIL
Filed Oct. 20, 1965

INVENTOR
EOLA R. BURNS
BY
Andrus & Starke
Attorneys 3,314,358
COOKING UTENSIL
Eola R. Burns, 401 Winsor Drive,
Antioch, Ill. 60002
Filed Oct. 20, 1965, Ser. No. 498,812
7 Claims. (Cl. 99—349)

This invention relates to a cooking utensil and more particularly to a cooking utensil for frying bacon.

When frying bacon it is difficult to obtain uniform cooking of the entire strip due to the fact that the bacon curls and shrinks when heated. Moreover, to obtain even cooking on both sides it is necessary to frequently turn the bacon which often results in spattering of the grease.

The present invention is directed to a utensil to be used with a conventional frying pan and provides uniform cooking of the etnire strip of bacon without turning. More specifically the utensil comprises a cover or lid to be inserted in the frying pan and the cover is provided with a series of downwardly extending projections or dimples which are spaced over the entire surface area of the cover. In addition to the downwardly extending dimples, the cover also includes a series of upwardly extending projections or dimples which are located adjacent the center of the cover. The downwardly extending dimples engage the bacon and hold it down against the bottom of the pan to prevent shrinkage and curling of the bacon. Moreover, the downwardly extending dimples space the cover above the bottom surface of the pan to provide a space for the flow of grease over the upper surface of the bacon so that the flowing grease will aid in cooking the upper surface.

The upwardly projecting dimples are arranged adjacent the center of the cover which is located above the hot central portion of the pan. The heat can rise into the dimples away from the bottom of the pan, resulting in a more even distribution of heat so that the bacon located adjacent the outer periphery of the pan will cook at substantially the same rate as the bacon located adjacent the center of the pan.

The cover or lid to be used with a conventional frying pan has distinct advantages when used in frying bacon. The cover which encloses the entire frying surface area of the pan eliminates spattering and provides uniform cooking of the entire strip of bacon without turning. Moreover, as the bacon is held down against the bottom of the frying pan by the downwardly extending dimples, the bacon will remain in a relatively flat condition and will not curl or shrink.

Other objects and advantages will appear in the course of the following description.

The drawings illustrate the best mode presently contemplated of carrying out the invention.

Figure 1:
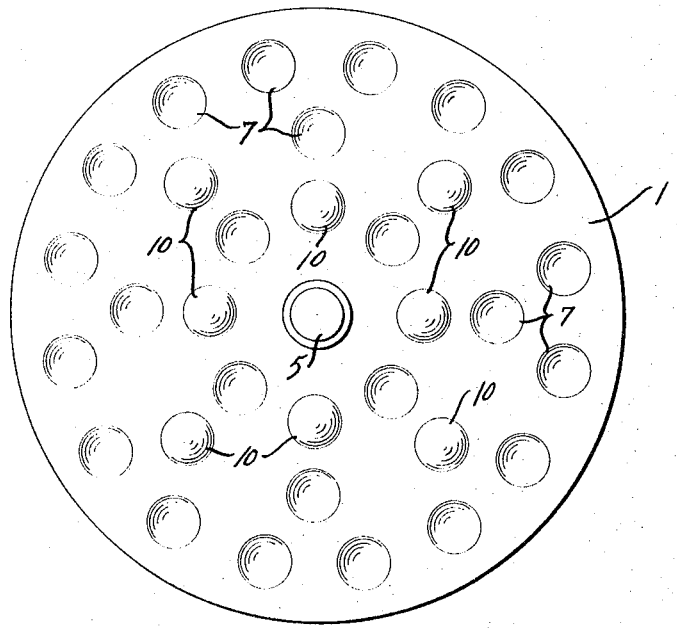
FIG. 1 is a plan view of the frying pan cover of the invention.
Figure 2:
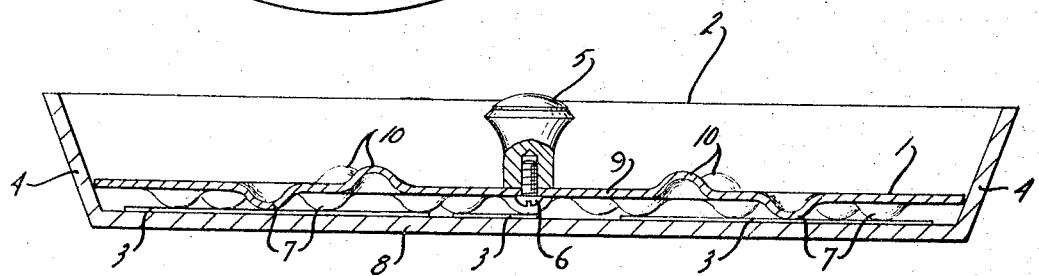
FIG. 2 is a vertical section of the cover as associated with a frying pan.

The drawings illustrate a cover or lid 1 which is adapted to be utilized with a conventional frying pan 2 for cooking strip of bacon 3 or other relatively flat food products. As shown in the drawings, the pan 2 is generally circular in shape and the cover 1 has a complementary shape so that it fits within the upwardly extending peripheral flange 4 of the pan. It is contemplated in cases where the pan has a square or rectangular shape the lid 1 will similarly have a square or rectangular contour.

To handle the cover, a knob 5 is mounted centrally of the cover and is secured to the cover by a screw 6.

Figure 3:
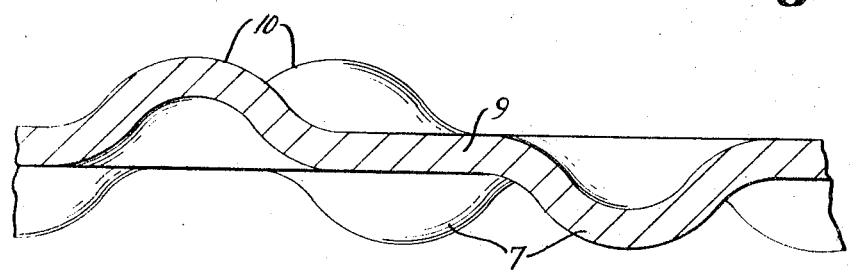
FIG. 3 is an enlarged fragmentary vertical section of the cover.

The cover 1 is provided with a series of downwardly extending dimples 7 which are arranged over the entire surface area of the cover. As best shown in FIG. 3 the dimples 7 are generally curved in cross section and the lower surface or tip bears against the bottom 8 of the pan 2 and serves to hold the strips of bacon 3 tightly against the surface 8. As shown in FIG. 1 a series of dimples 7 are arranged in a generally circular pattern around the periphery of the cover and are spaced so that each piece of bacon will be contacted by at least one of the dimples in the outer ring. In addition, a second series of the dimples 7 are located adjacent the center of the cover and again it is contemplated that each strip of bacon will also be engaged by one of the inner series of dimples 7 so that under normal circumstances each strip of bacon will be engaged by two of the downwardly extending dimples 7, thereby holding the bacon firmly against the bottom of the pan 2 to prevent curling and shrinking.

In addition to holding the bacon against the bottom 8 of the pan, the dimples perform a second function in that they provide a spacing between the relatively flat body 9 of the cover and the bottom 8 of pan 2 with the space between these members serving as a passage for the flow of grease over the top of the bacon. The grease flowing over the top of the bacon aids in cooking the upper surface of the bacon. It is also contemplated that the lower surface of the cover 1 can be polished to provide a high degree of reflectivity so that the heat will be reflected downwardly against the upper surface of the bacon. However, it is believed that the principal cooking effect for the upper surface of the bacon is achieved by the grease flowing across the surface between the body 9 of cover 1 and the bottom 8 of the pan 2.

In addition to the downwardly extending dimples 7 the cover 1 is also provided with a series of upwardly extending dimples 10 which are located adjacent the center of the cover. Normally the center of the pan is the hottest area and the dimples 10 provide areas of increased height adjacent the center so that the heat can rise into the dimples 10 to get better heat distribution over the entire surface area of the lid. This insures that the portions of the bacon located adjacent the periphery of the cover will be cooked at substantially the same rate as the portions of the bacon strips located at the center of the pan.

As an added feature the dimples 7 and 10 also increase the rigidity of the cover so that the cover itself can be formed of thinner gauge material and will still be capable of resisting bending and deformation.

The cooking utensil of the invention encloses substantially the entire bottom 8 of the pan 2 and thereby prevents spattering of the grease. As the downwardly extending dimples 7 engage the strips of bacon and hold the bacon against the bottom surface 8 of the pan, shrinkage and curling bacon is reduced. Moreover, the downwardly extending dimples 7 provide a passage between the cover and the bottom of the pan and the hot grease flows through the passages and over the upper surface of the bacon to increase the cooking of the upper surface of the bacon strip. The upwardly extending projection or dimples 10 cooperate with the downwardly extending projections to provide areas at the center of the pan into which the heat can rise, and thereby provide more uniform heat distribution throughout the entire surface area of the pan.

While the above description has been directed to the cooking of bacon it is contemplated that other flat food items can also be cooked with the device of the invention.

Various modes of carrying out the invention are contemplated as being within the scope of the following claims particularly pointing out and distinctly claiming the subject matter which is regarded as the invention.

I claim:

1. A utensil to be used in conjunction with a cooking device to cook generally flat articles of food, comprising a body section, a first series of projections spaced generally throughout the surface of said body section and extending downwardly from said body section, the lower extremities of said first series of projections lying in a common plane and adapted to engage the article of food and hold the article against a surface of the cooking device, and a second series of generally hollow projections extending upwardly from said body section and spaced from each other and spaced from said first series of projections, said second series of projections being arranged generally centrally of the body section and serving as heat distribtuing domes to thereby aid in providing a uniform distribution of heat throughout the entire area of said body section.

2. The utensil of claim 1 and including a heat insulating member secured to said body section and extending upwardly therefrom and adapted to be grasped by user to raise and lower said utensil.

3. A utensil to be used in conjunction with a frying pan to cook strips of bacon, comprising, a generally flat body section, a first series of downwardly extending projections circularly spaced around the periphery of the body section, a second series of downwardly extending projections arranged in spaced relation adjacent the center of said body section, the lower extremities of said first and second series of projections lying in a common plane and adapted to engage the strips of bacon and hold the strips against the bottom of the pan, and a third series of upwardly extending dome-like projections arranged in spaced relation centrally of the body section and serving as heat distributing domes to thereby aid in providing a uniform distribution of heat throughout the entire area of said body section.

4. A utensil to be used in conjunction with a frying pan to cook strips of bacon comprising, a generally flat body section, a first series of downwardly extending generally rounded dimples circularly spaced around the periphery of the body section, a second series of downwardly extending generally rounded dimples arranged in spaced relation adjacent the center of said body section, the lower extremities of said first and second series of dimples lying in a common plane and adapted to engage the strips of bacon and hold the strips against the bottom of the pan, a third series of upwardly extending dimples arranged in spaced relation centrally of the body section and serving as heat distributing domes to thereby aid in providing a uniform distribution of heat throughout the entire area of said body section.

5. The utensil of claim 4 in which the utensil is formed of sheet metal and the thickness of the metal of the body section is substantially equal to the thickness of metal in the dimples.

6. The utensil of claim 3 in which the lower surface of the body section is polished and heat reflective.

7. A utensil to be used in conjunction with a frying pan to cook strips of bacon, comprising, a generally flat body section, a first series of downwardly extending inverted dome-like dimples arranged in spaced relation throughout the entire surface area of said body section, and a second series of upwardly extending dome-like dimples arranged in spaced relation centrally of the body section, and the peripheral edge portion of said body section being free of said second series of dimples, said second series of dimples serving as heat distributing domes to thereby aid in providing a uniform distribution of heat throughout the entire area of said body section.

References Cited by the Examiner

UNITED STATES PATENTS

| | | | |
|---|---|---|---|
| 1,881,615 | 10/1932 | Isaacson | 99—349 |
| 2,241,040 | 5/1941 | Pringle | 99—349 X |
| 2,411,345 | 11/1946 | Suttles | 99—349 |
| 2,544,846 | 3/1951 | Mach | 99—355 |
| 2,774,316 | 12/1956 | Daino. | |
| 3,076,405 | 2/1963 | Lang | 99—349 X |
| 3,252,404 | 5/1966 | Cox | 99—349 |

BILLY J. WILHITE, *Primary Examiner.*